Jan. 14, 1958 R. B. COLT 2,819,615
APPARATUS FOR MEASURING RATE OF CHANGE OF PRESSURE
Filed April 1, 1954
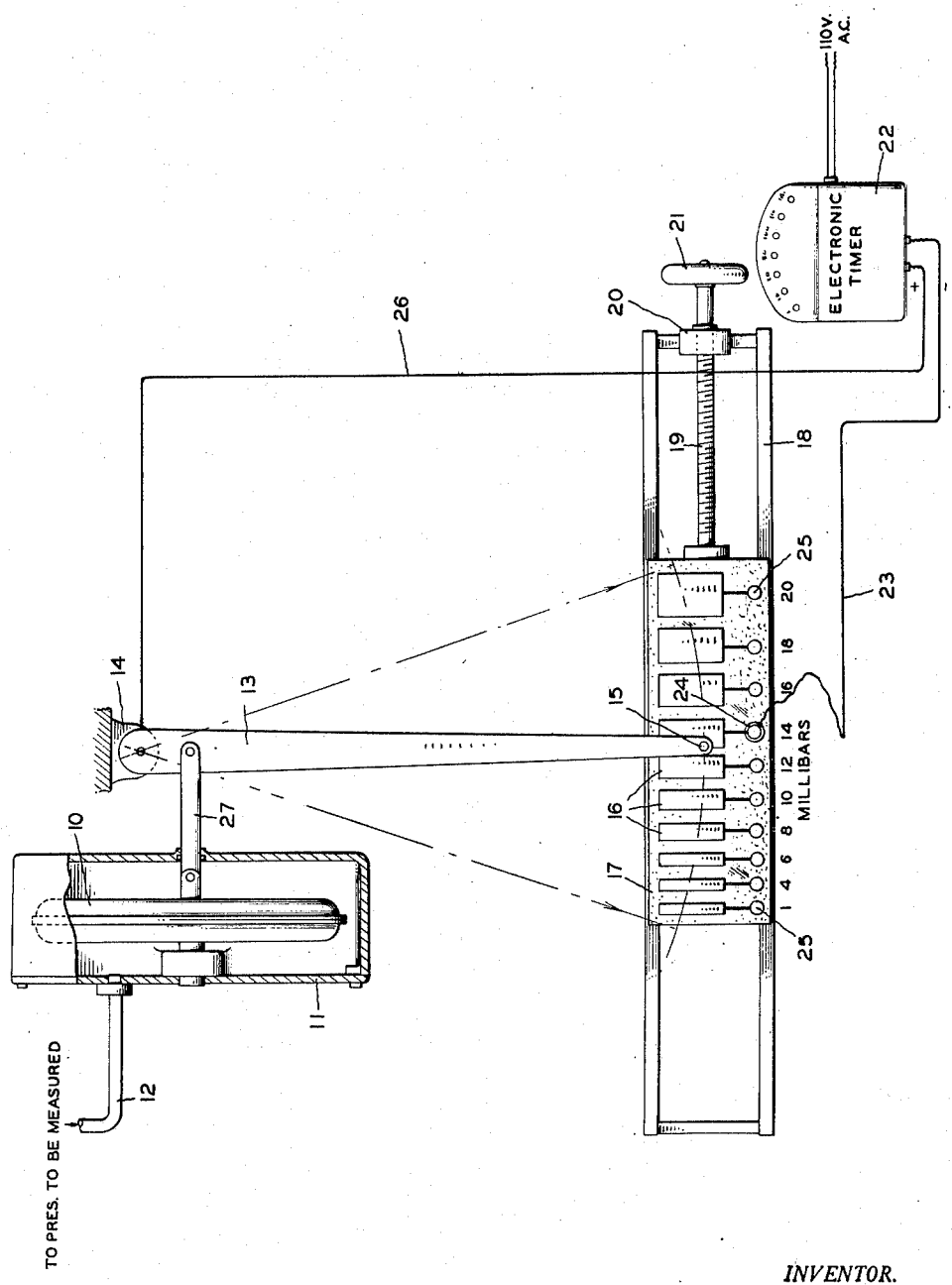
INVENTOR.
Rutger B. Colt.
BY
K.G. Doub
ATTORNEY United States Patent Office 2,819,615
Patented Jan. 14, 1958

2,819,615

APPARATUS FOR MEASURING RATE OF CHANGE OF PRESSURE

Rutger B. Colt, Baltimore, Md., assignor to Bendix Aviation Corporation, Baltimore, Md., a corporation of Delaware Application April 1, 1954, Serial No. 420,315

5 Claims. (Cl. 73—389)

This invention relates to means for measuring the rate of change of pressure, or for measuring the rate of change of some parameter which changes as a function of pressure. An example of one of the uses to which the apparatus may be put is to measure the rate of change of pressure of devices in production, as for timing pressure switches, testing pressure responsive or pressurizing equipment, and the like.

The primary object of the invention is to provide a simplified yet highly effective apparatus for measuring the rate of change of pressure, or some parameter or function which changes as a function of changes in pressure.

The foregoing and other objects and advantages will become apparent in view of the following description taken in conjunction with the drawings, wherein the sole figure is a plan view, essentially schematic or diagrammatic, of apparatus embodying the invention.

Referring to the drawing, a pressure responsive member, here shown in the form of a capsule of the diaphragm type, is indicated at 10. This member may be evacuated for response to changes in pressure only, or it may be partially evacuated or charged with a suitable gas which will render it responsive to changes in both pressure and temperature, depending upon the conditions of operation to which the device may be subjected. The capsule 10 may be mounted in a sealed housing or container 11, having a suitable connection 12, for communicating the pressure to be measured to the housing. For certain installations, as when mounted on an aircraft for sensing changes in altitude, the housing may be dispensed with, or it may simply be vented to the atmosphere.

A switch arm of electrical conducting material is indicated at 13. One end of the arm 13 is pivotally anchored at 14, and at its opposite end it is provided with a contact member 15, adapted to engage any selected one or more of a plurality of conducting elements shown in the form of commutator segments 16, varying in width for a purpose to be specified. The segments 16 may be located in a suitable bed 17, of insulating material, and the latter supported for adjustment as a unit in a frame 18 by means of a screw 19, which is threaded through a nut connected to one end of the bed 17, said screw at its opposite end being journaled in a boss 20 and terminating in an adjusting handle 21. The segments 16 may be selectively connected to a suitable electric timer, preferably of the electronic type such as indicated at 22, by way of a conductor 23, provided at its one end with a connector 24, adapted to engage any selected one of a series of terminals 25, electrically connected to the segments 16. When the contact 15, carried on the free or moving end of the switch arm 13, engages any one of the segments 16, an input circuit is completed to the timer by way of wire 26, arm 13 and wire 23. Electronic timers of the type shown at 22 may be purchased as a unit in the market, and since their function and operation are well understood by those having an elementary knowledge of the art, it is not deemed necessary to describe the timer in detail in the present instance. These timers may be provided with suitable indicia, calibrated in units of time, which light up or become illuminated when the input circuit is closed or becomes energized due to engagement of contact 15 with any one of the segments 16. This starts the timing cycle. When contact 15 moves clear of a segment, the circuit is broken and the timing cycle is completed. The capsule 10 is connected to the switch arm 13 by suitable linkage, such as indicated at 27.

The respective segments 16 are each of a predetermined contact length or width. Thus, starting at the left, the segments may be progressively calibrated in pressure units according to their effective contact width. As here shown, the segments are calibrated in terms of millibars from 1 to 20. Obviously, instead of having a continuous conductor or segment, spaced make-and-break contacts could be utilized and calibrated in the same manner as the segments 16.

Example of operation

In the position of the parts as shown in the drawing, the contact 15 carried by the switch arm 13 is just about to ride on the segment having a conducting width of 14 millibars, assuming that it is desired to measure the rate of change of pressure in a minus direction. As the pressure decreases, the capsule 10 will expand and move the switch arm 13 in a counter-clockwise direction at a rate proportional to the rate of decrease. As the contact sweeps across the 14 millibar segment, the electronic timer becomes energized and indicates the time, say in milliseconds, required for the contact 15 to traverse the segment. This will be a true indication of the rate of change of the pressure being measured.

Once the apparatus is calibrated, any particular segment may be selected without disturbing the calibration, simply by adjusting the position of the bed 17 on the frame 18.

While only one embodiment of the invention is illustrated and described herein, yet the disclosure is fully adequate to teach those having a knowledge of the art the principles of construction and operation and also how to adapt the invention to different installations without departing from the spirit and scope of the invention as defined by the appended claims.

What is claimed and desired to be secured by United States Letters Patent is:

1. In apparatus of the type specified, a pressure responsive device, one or more electrical conducting elements each having a predetermined contact width calibrated in terms of pressure units, a switch member operatively connected to said device to be driven thereby continuously during changes in pressure to which the device may be subjected, a contact carried by said switch member and adapted to traverse a selected element or elements, and an electric timer having an input make-and-break circuit including said switch member and said selected element or elements, said timer circuit being completed during the period of time said contact is traversing any one of said elements.

2. In apparatus of the type specified, a pressure responsive device, a switch member operatively connected to said device to be driven thereby continuously during changes in pressure to which the device may be subjected, a plurality of conducting elements each having an effective contact width calibrated in terms of pressure units, a contact carried by said switch member and adapted to traverse a selected element or elements, an electric timer having an input make-and-break circuit including a selected element and said switch member, said timer circuit being completed during the period of time said contact is traversing any one of said elements, and means for positioning any selected element for engagement by said switch member.

3. In apparatus of the type specified, a plurality of commutator segments insulated from one another, said segments having progressively increasing effective conducting widths calibrated in terms of pressure units, a pressure responsive capsule and a housing therefor, means for connecting said housing to the pressure to be measured, a switch arm operatively connected to said pressure responsive element to be moved by the latter in relation to changes in pressure and having a contact adapted to engage and wipe said segments, means for positioning said segments relatively to said switch arm and contact member, and an electric timer having an input circuit including any selected one of said segments, said switch arm and contact, said timer circuit being completed across any selected one of said segments while said contact is in wiping engagement with said selected segment.

4. Apparatus for measuring the rate of change of pressure comprising: an electric timer having a make-and-break control circuit, a plurality of conducting segments insulated from one another, said segments being of different effective conducting widths and calibrated in terms of pressure units, a pressure-responsive capsule and means defining a chamber in which said capsule is mounted, means for connecting said chamber to the pressure to be measured, a switch arm operatively connected to said pressure-responsive capsule to be moved by the latter in relation to changes in pressure and continuously during such changes, a contact member carried by said arm and adapted to engage and wipe a selected segment or segments, means for adjusting said segments relative to said switch arm and contact member, said selected segment or segments, said switch arm and said contact member being arranged in said circuit in a manner such as to cause actuation of the timer during the time said contact member is in wiping engagement with said selected segment or segments.

5. In apparatus of the type specified, a pressure responsive device, an electric timer having a make-and-break circuit, a movable contact member in said circuit having an operative connection with said device to be continuously driven thereby during a change in pressure, and a plurality of circuit make-and-break elements arranged in series for engagement by said contact member, each element being calibrated in terms of pressure units for the circuit-make period for energizing said timing circuit during said make period, said elements having different effective circuit-make time periods.

References Cited in the file of this patent

UNITED STATES PATENTS

| | | |
|---|---|---|
| 1,187,334 | Keppler | June 13, 1916 |
| 2,388,387 | Cohen | Nov. 6, 1945 |